(12) United States Patent
Hardin

(10) Patent No.: US 11,986,908 B1
(45) Date of Patent: May 21, 2024

(54) SYSTEM AND APPARATUS FOR INSPECTING WELDS IN NORMAL AND TRANSVERSE DIRECTIONS

(71) Applicant: Valmont Industries, Inc., Omaha, NE (US)

(72) Inventor: Grady A. Hardin, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 420 days.

(21) Appl. No.: 17/350,572

(22) Filed: Jun. 17, 2021

Related U.S. Application Data

(60) Provisional application No. 63/048,261, filed on Jul. 6, 2020.

(51) Int. Cl.
*B23K 31/00* (2006.01)
*B23K 31/12* (2006.01)
*G01N 29/22* (2006.01)

(52) U.S. Cl.
CPC ......... *B23K 31/125* (2013.01); *G01N 29/223* (2013.01); *G01N 2291/044* (2013.01)

(58) Field of Classification Search
CPC ............... B23K 31/125; B23K 20/123; G01N 2291/2675; G01N 2291/267; G01N 2291/106
See application file for complete search history.

(56) References Cited

U.S. PATENT DOCUMENTS

| | | | |
|---|---|---|---|
| 7,938,008 B2 * | 5/2011 | Owens | G01N 29/043 73/632 |
| 9,816,964 B1 * | 11/2017 | Nguyen-Dinh | G01S 15/8925 |
| 10,161,913 B2 * | 12/2018 | Cendras | G01N 29/04 |
| 11,518,111 B2 * | 12/2022 | Barbone | B29C 65/8292 |
| 2013/0192334 A1 * | 8/2013 | S | G01N 29/0645 73/1.82 |
| 2015/0346164 A1 * | 12/2015 | St-Laurent | G01N 29/32 73/588 |
| 2016/0209374 A1 * | 7/2016 | Cendras | G01N 29/043 |
| 2017/0138909 A1 * | 5/2017 | Ostergren | G01N 29/2487 |
| 2018/0292357 A1 * | 10/2018 | Leach | G01N 29/262 |
| 2021/0129452 A1 * | 5/2021 | Barbone | G01N 29/041 |

* cited by examiner

*Primary Examiner* — Erin B Saad
(74) *Attorney, Agent, or Firm* — Milligan PC LLO

(57) ABSTRACT

The present invention includes an improved transducer wedge assembly for inspecting welds and other formations. According to a first preferred embodiment, the transducer wedge assembly includes a central spacer wedge fixed between a first transducer wedge and a second transducer wedge. The central spacer wedge is preferably formed from cork or other insulating material. Additionally, the central spacer wedge preferably includes a wave direction side and a back side, with the back side of the spacer wedge producing an offset angle between the first transducer wedge and the second transducer wedge.

18 Claims, 4 Drawing Sheets

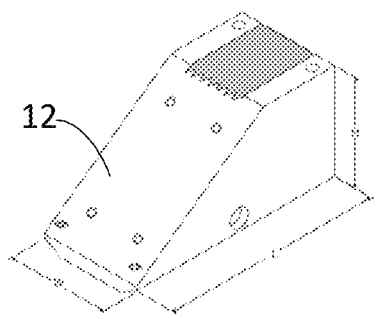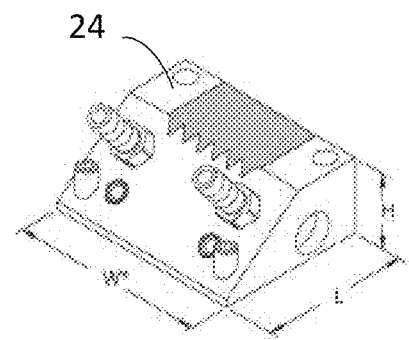
FIG. 3
FIG. 4

SYSTEM AND APPARATUS FOR INSPECTING WELDS IN NORMAL AND TRANSVERSE DIRECTIONS

RELATED APPLICATIONS

The present application claims priority to U.S. Provisional Application No. 63/048,261 filed Jul. 6, 2020.

FIELD OF THE PRESENT INVENTION

The present invention relates to a system, method and apparatus for inspecting welds in normal and transverse directions.

BACKGROUND OF THE INVENTION

Ultrasonic Testing (UT) uses high frequency sound energy to conduct examinations and make measurements of welds. A typical UT inspection system consists of several functional units, such as the pulser/receiver, transducer, and display devices. A pulser/receiver is an electronic device that can produce high voltage electrical pulses. Driven by the pulser, the transducer generates high frequency ultrasonic energy. The sound energy is introduced and propagates through the materials in the form of waves. When there is a discontinuity (such as a crack) in the wave path, part of the energy will be reflected back from the flaw surface. The reflected wave signal is transformed into an electrical signal by the transducer and is displayed on a screen.

Phased array ultrasonic testing is an improved version of UT testing which uses computer-controlled excitation (amplitude and delay) of individual elements. Phased arrays are arrays of ultrasound transducers that fire individual elements on the array in a specific sequence in order to direct the sound wave in a specific direction. FIG. 5 illustrates a conventional scanning arrangement 2 with a phased array (PA) probe 4 projecting a beam of ultrasonic waves within a solid body/weld 8. As shown, the probe/transducer 4 is attached to a transducer wedge 6 which serves as an optical lens-type device. The transducer wedge 6 directs and steers the beam of ultrasonic waves to the desired examination area. In this manner, the transducer wedge 6 can partially control characteristics of the beam such as the width and direction of the beam and can assist to "focus" the beam waves on a given area of interest.

Transducer wedges greatly enhance the number of applications that can be used with phased arrays. At the same time, transducer wedges are limited by a number of factors. Most importantly, the steering capabilities of any particular wedge are limited. For this reason, phased array inspections commonly require multiple scans in order to inspect a given area when more than one direction is required to obtain full coverage. These arrangements create further issues because the placement of multiple wedges is a time-consuming process and the relative positions between each wedge create unwanted interactions between beam waves. What is needed is an improved transducer wedge assembly which can reliably perform both normal and transverse scanning in one pass.

SUMMARY OF THE PRESENT INVENTION

The present invention overcomes the limitations of the prior art by providing an improved transducer wedge for inspecting welds in normal and transverse directions using known scanning patterns such as those specified by the American Welder Society (AWS) standards.

According to a first preferred embodiment, the present invention includes a transducer wedge assembly having a central spacer wedge fixed between a first transducer wedge and a second transducer wedge. The central spacer wedge is preferably formed from cork or other insulating material. Additionally, the central spacer wedge is preferably attached to a first side of the first wedge and a second side of the second wedge.

According to a further preferred embodiment, the central spacer wedge preferably includes a wave direction side and a back side, with the back side of the spacer wedge producing an offset angle between the first transducer wedge and the second transducer wedge. According to a further preferred embodiment, the offset angle between the transducer wedges is preferably equal to 15 degrees.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

FIG. 3 is a perspective view of an exemplary transducer wedge for use with the improved wedge assembly of the present invention.

FIG. 4 is a perspective view of a first alternative transducer wedge for use with the improved wedge assembly of the present invention.

DESCRIPTION OF THE PREFERRED EMBODIMENTS

Aspects of the present invention will be explained with reference to exemplary embodiments and examples which are illustrated in the accompanying drawings. These descriptions, embodiments and figures are not to be taken as limiting the scope of the claims.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e. meaning "must"). It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The word "exemplary" as used herein is intended to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or disadvantages of prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

Figure 1:
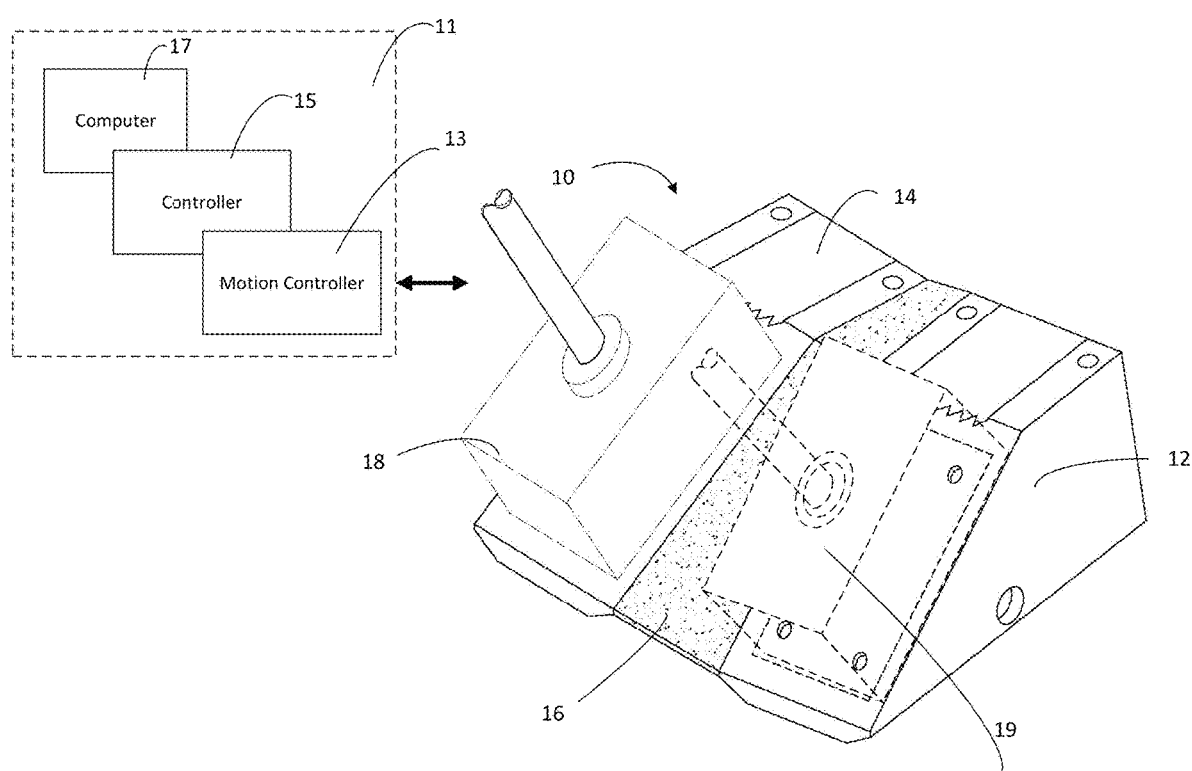
FIG. 1 is a perspective view of an exemplary embodiment of an improved transducer wedge assembly according to a first preferred embodiment of the present invention.

With reference now to FIG. 1, a perspective view of an exemplary embodiment of an improved transducer wedge assembly 10 according to a first preferred embodiment of the present invention is provided. As shown, the exemplary transducer wedge assembly 10 preferably comprises a first transducer wedge 12 and a second transducer wedge 14. As shown, the first and second transducer wedges 12, 14 are secured to opposite sides of an insulated spacer wedge 16. According to a preferred embodiment, the spacer wedge 16 may preferably be formed of an insulating material which is structurally sturdy enough to support the attachment of the transducer wedges 12, 14. Preferably, the spacer wedge 16 may be formed of cork. Alternatively, the spacer wedge 16 may be formed of other materials such as Styrofoam, plastic (e.g. polyethylene terephthalate (PET) the like), rubber or similar materials. As shown, each transducer wedge 12, 14 is preferably formed to allow a probe/transducer 18, 19 to attach and to project ultrasonic waves through each respective wedge 12, 14 and onto a weld surface to be inspected.

According to a preferred embodiment, the beam parameters of each attached transducer 18, 19 are controlled by a control system 11 which may include a computer 17 and a controller 15. The controller 15 may be any suitable phased array probe control unit adapted to manipulate the transducers 18, 19. The computer 17 may preferably contain software for programming the controller 15 to adjust beam parameters (such as, for example, angle, focal distance, focal points) in order to perform an examination of a target area (e.g. a weld or the like). Additionally, other control units could be employed. For example, a motion control unit 13 may be used for automatically positioning and installing the probes.

Figure 2:
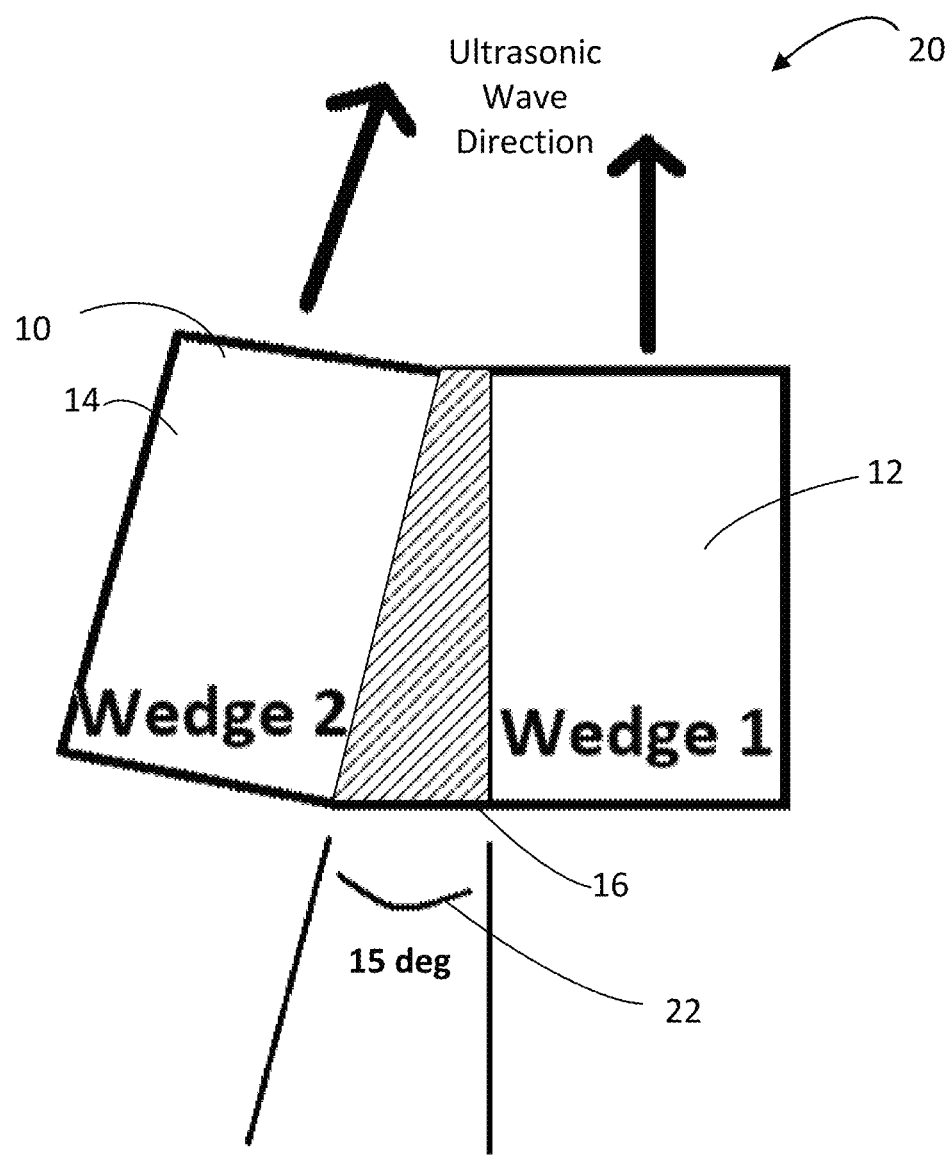
FIG. 2 is a block diagram illustrating an overhead view of the exemplary embodiment shown in FIG. 1.
Figure 5:
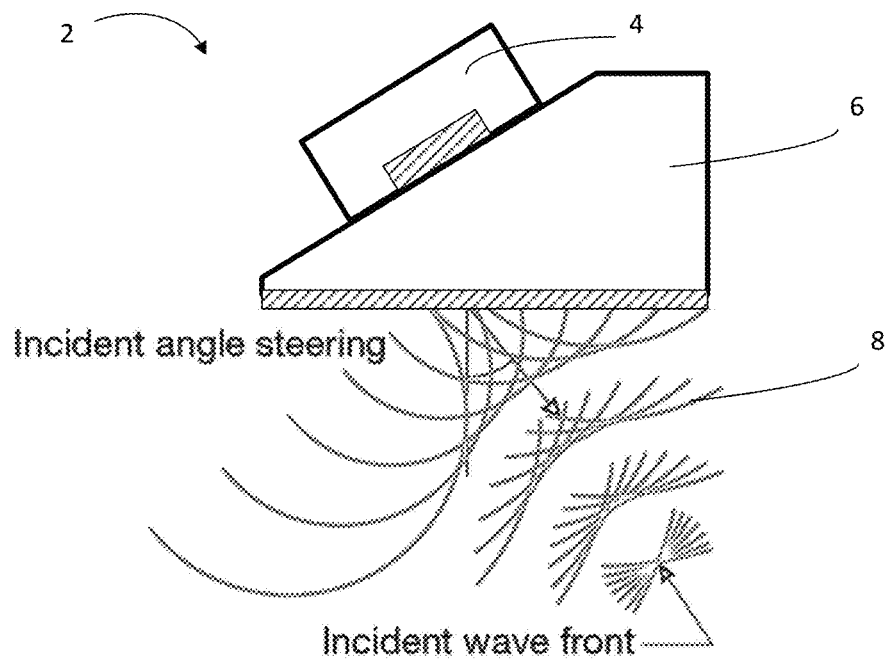
FIG. 5 is a block diagram of an exemplary phased array probe arrangement as known in the prior art.

Referring now to FIG. 2, a block diagram illustrating an overhead view 20 of the exemplary transducer wedge assembly 10 is provided. As shown, the first and second transducer wedges 12, 14 are preferably attached to a central spacer wedge 16 which is formed to provide a fixed offset angle 22 between the wedges 12, 14. Accordingly, waves projected by each attached probe/transducer (not shown) may be directed to converge with an angle of intersection which is inverse to the selected angle offset 22. According to a preferred embodiment, the angle offset 22 may preferably be 15 degrees. Alternatively, the angle offset may be any angle between 1-180 degrees. For example, the angle offset may be 5°, 10°, 12°, 20°, 25°, 30°, 40°, or 50°.

According to a preferred embodiment, each transducer 18, 19 may preferably transmit and receive their own signals individually. Alternatively, the attached transducers 18, 19 may be controlled to receive signals from the opposite transducer or some combination of signals from each.

With reference now to FIG. 3, a perspective view of an exemplary transducer wedge 12 for use with the present invention is provided. According to a preferred embodiment, each transducer wedge 12 may be formed with a variety of dimensions. According to a first preferred embodiment, the dimensions of the transducer wedge 12 may include a Length (L) of 49 mm, a Width (W) of 30 mm and a Height (H) of 32 mm. According to alternative embodiments, the dimensions of the transducer wedge 12 may be increased or decreased with the proportions changing or remaining constant.

Additionally, the present invention may preferably be used with any of a variety of other transducer wedge designs and arrangements. For example, as shown in FIG. 4, a first alternative transducer wedge 24 for use with the present invention may be an Irrigation Holes and Carbide (IHC) wedge which may be hooked up to an irrigation tubing system (not shown) and which may be used to pump irrigation system liquid (e.g. water) into the wedge and/or onto the part directly underneath the wedge.

The present invention has been disclosed above with reference to several examples. These examples are not intended to be limiting. Instead, the scope of the present invention should be determined purely by the terms of the appended claims and their legal equivalents.

What is claimed is:

1. A transducer wedge assembly, wherein the transducer wedge assembly comprises:
    a first transducer wedge;
    a second transducer wedge; and
    a central spacer wedge;
    wherein the central spacer wedge comprises insulating material;
    wherein the central spacer wedge is attached to a first side of the first transducer wedge and to a second side of the second transducer wedge;
    wherein the central spacer wedge comprises a front, wave direction side and a back side; wherein the width of the back side of the central spacer wedge produces a fixed offset angle between the first transducer wedge and the second transducer wedge.

2. The transducer wedge assembly of claim 1, wherein the offset angle is within the range of 5°-50°.

3. The transducer wedge assembly of claim 2, wherein the offset angle is selected from a first group of offset angles, wherein the first group of offset angles comprises 5°, 10°, 12°, 15°, 20°, 25°, 30°, 40°, and 50°.

4. The transducer wedge assembly of claim 3, wherein the offset angle is equal to 15°.

5. The transducer wedge assembly of claim 4, wherein the central spacer wedge is formed of cork.

6. The transducer wedge assembly of claim 4, wherein the central spacer wedge is formed of material selected from a first group of materials comprising: Styrofoam, plastic, polyethylene terephthalate (PET) and rubber.

7. The transducer wedge assembly of claim 5, wherein the first transducer wedge comprises: a first transducer attachment surface; wherein the first transducer attachment surface comprises a first sloped surface.

8. The transducer wedge assembly of claim 7, wherein the transducer wedge assembly comprises: a first transducer; wherein the first transducer is configured to attach to the first transducer attachment surface; wherein the first transducer is configured to project ultrasonic waves through the first transducer wedge and onto a weld surface to be inspected.

9. The transducer wedge assembly of claim 8, wherein the second transducer wedge comprises: a second transducer attachment surface; wherein the second transducer attachment surface comprises a second sloped surface.

10. The transducer wedge assembly of claim 9, wherein the transducer wedge assembly comprises: a second transducer; wherein the second transducer is configured to attach to the second transducer attachment surface; wherein the second transducer is configured to project ultrasonic waves through the second transducer wedge and onto a weld surface to be inspected.

11. The transducer wedge assembly of claim 10, wherein the transducer wedge assembly further comprises: a phased array probe control unit; wherein the phased array probe control unit is configured to adjust one or more beam parameters of the first or second transducers.

12. The transducer wedge assembly of claim 11, wherein at least one beam parameter is selected from a group of beam parameters comprising: angle, focal distance and focal point.

13. The transducer wedge assembly of claim 12, wherein at least one of the first or second transducer wedges comprises an irrigation holes and carbide wedge.

14. The transducer wedge assembly of claim 13, wherein the irrigation holes and carbide wedge is configured to attach to an irrigation tubing system.

15. The transducer wedge assembly of claim 14, wherein the irrigation holes and carbide wedge is configured to receive irrigation system liquid into the body of the irrigation holes and carbide wedge.

16. The transducer wedge assembly of claim 12, wherein the first transducer wedge comprises a length of 49 mm.

17. The transducer wedge assembly of claim 16, wherein the first transducer wedge comprises a width of 30 mm.

18. The transducer wedge assembly of claim 17, wherein the first transducer wedge comprises a height of 32 mm.

* * * * *